US005745907A

United States Patent [19]
Yamamoto

[11] Patent Number: 5,745,907
[45] Date of Patent: Apr. 28, 1998

[54] IMAGE REGISTERING APPARATUS, IMAGE REGISTERING METHOD, AND ITS SYSTEM

[75] Inventor: Kunihiro Yamamoto, Yokohama, Japan

[73] Assignee: Canon Kabushiki Kaisha, Tokyo, Japan

[21] Appl. No.: 543,344

[22] Filed: Oct. 16, 1995

[30] Foreign Application Priority Data

Oct. 18, 1994 [JP] Japan ............................ 6-278448
Oct. 20, 1994 [JP] Japan ............................ 6-255184

[51] Int. Cl.⁶ ................................................ G06T 1/00
[52] U.S. Cl. ................................ 707/502; 707/1
[58] Field of Search .......................... 395/115, 601, 395/766, 767, 768, 175, 200.3, 682; 707/502, 500, 523, 524, 1, 104; 345/127, 439

[56] References Cited

U.S. PATENT DOCUMENTS

| | | | |
|---|---|---|---|
| 4,641,197 | 2/1987 | Miyagi | 395/450 |
| 5,010,581 | 4/1991 | Kanno | 395/305 |
| 5,179,649 | 1/1993 | Masuzaki et al. | 395/768 |
| 5,353,397 | 10/1994 | Yokoyama et al. | 707/502 |
| 5,369,742 | 11/1994 | Kurosu et al. | 395/784 |
| 5,422,989 | 6/1995 | Bell et al. | 345/433 |
| 5,452,416 | 9/1995 | Hilton et al. | 345/346 |
| 5,517,605 | 5/1996 | Wolf | 345/326 X |
| 5,608,858 | 3/1997 | Kurosu et al. | 707/502 |

*Primary Examiner*—Joseph H. Feild
*Attorney, Agent, or Firm*—Fitzpatrick, Cella, Harper & Scinto

[57] ABSTRACT

An image registering apparatus which can register formed data without operating both of an image filing system and another system is provided. The image registering apparatus cooperatively operates an image filing application, a word processor application, and a filing system under the management of an operating system. In the case where the user who uses the image filing application registers a word processor document stored in the filing system into the image filing application, the file existing in the filing system is searched and whether the file is a word processor document or not is discriminated by an extension of the file. Subsequently, by an inter-process communicating function of the operating system, the image filing application starts the word processor application, forms an icon of the searched word processor document, and presents to a document list display window. By designating the presented icon, the user can register the word processor document. The operating efficiency can be improved. The double registration can be prevented.

51 Claims, 5 Drawing Sheets

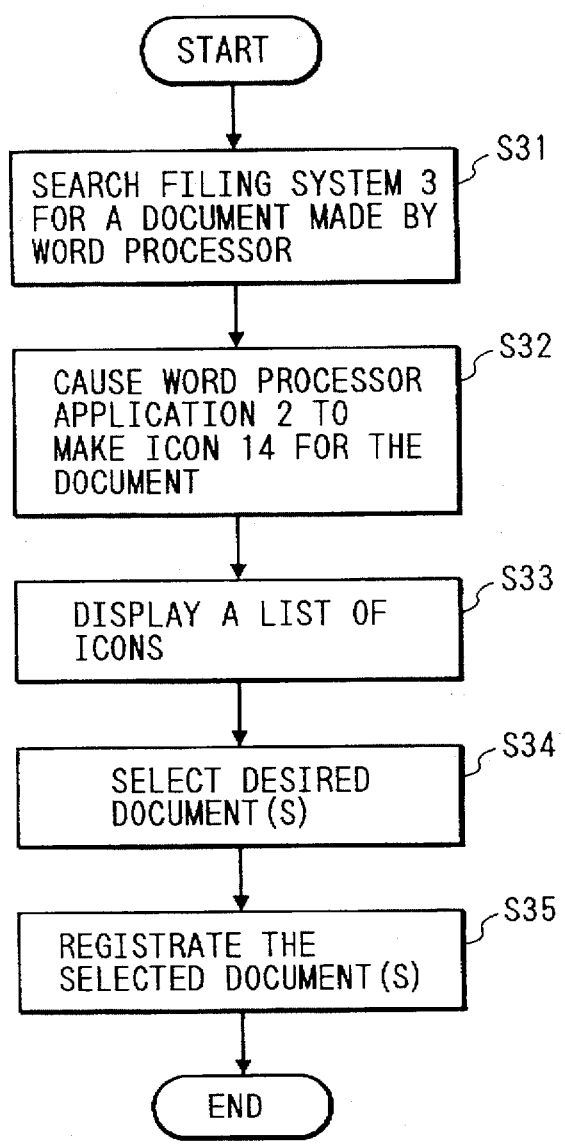

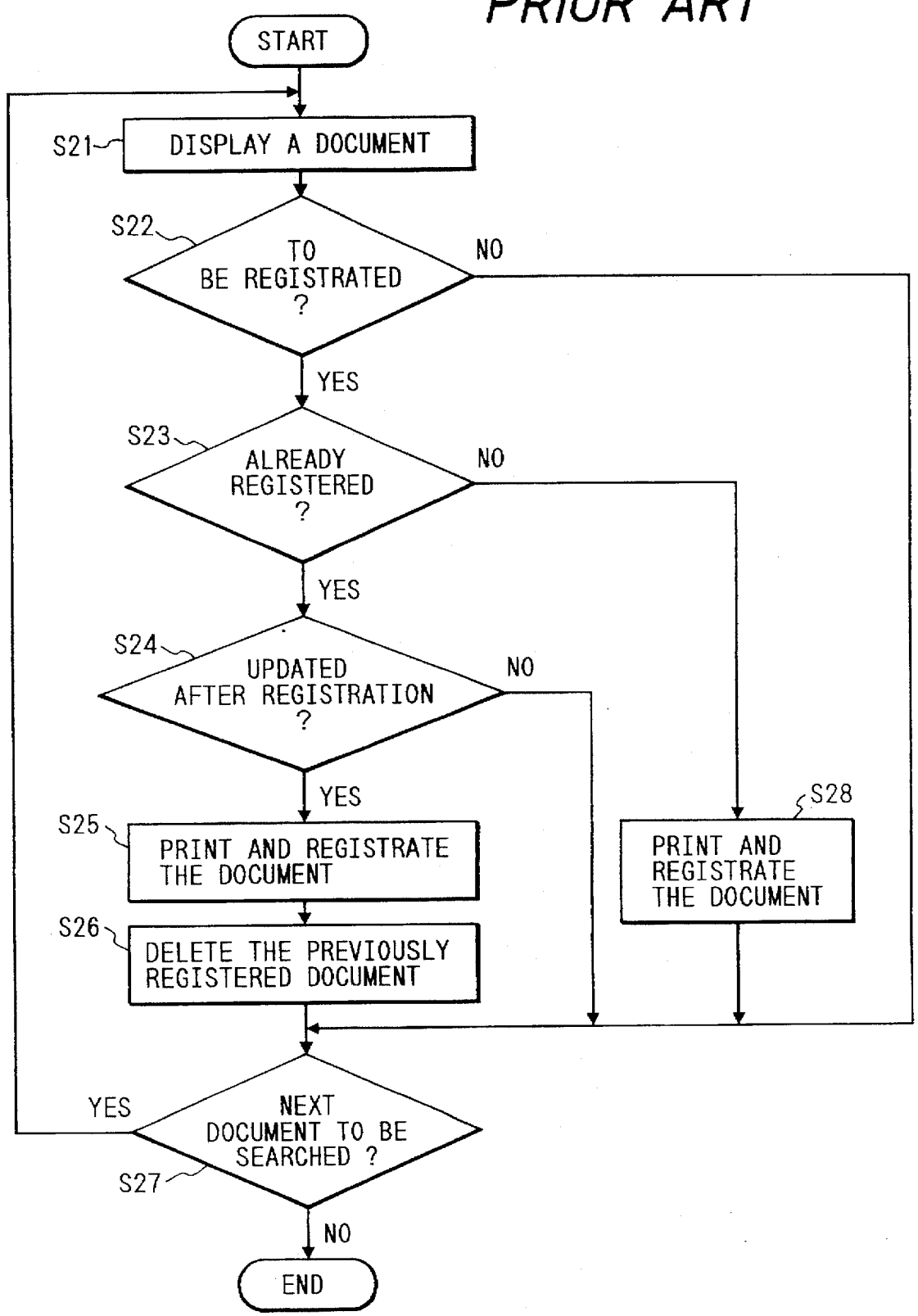

IMAGE REGISTERING APPARATUS, IMAGE REGISTERING METHOD, AND ITS SYSTEM

BACKGROUND OF THE INVENTION

1. Field of the Invention

The invention relates to a registration of a document formed by a word processor or the like into an image filing system.

2. Related Background Art

Hitherto, when a document formed by a word processor, a DTP (desk-top publishing), or the like is registered into an image filing system, generally, the document is printed by a word processor or the like and is read by a scanner of the image filing system and is registered.

FIG. 6 is a flowchart showing a conventional registering procedure as mentioned above. The user first displays the document contents by using a word processor application (step S21). Subsequently, a check is made to see if it is necessary to register the document into an image filing application or not from the displayed document contents (step S22). If NO, step S27 follows. If it is necessary to register the document, the image filing application is started and a check is made to see if the document has already been registered or not (step S23).

When the document is not yet registered, step S28 follows. The document is printed by the word processor application, the document is read through the scanner by the image filing application, and the processing routine advances to step S27.

In the case where the document has already been registered in step S23, a check is made to see if the document has been updated after it was registered into the image filing application or not (step S24). If NO, the processing routine advances to step S27.

When the document has been updated after it was registered in step S24, the document is printed from the word processor application and is taken into the image filing application through the scanner (step S25). The previously registered old image is deleted from the image filing application (step S26).

Subsequently, a check is made to see if the next document is searched or not (step S27). In case of continuing the search, the processing routine is returned to step S21. In case of stopping the search, the processing routine is finished.

The above conventional apparatus, however, has the following problems.

1. The word processor system needs to have the printer.
2. The image filing system needs to have the scanner.
3. It takes a time for printing and scanning.
4. It is necessary for the user to carry the document from the printer to the scanner.
5. A paper is necessary in order to print the paper and scan the printed paper by the scanner.
6. Since the paper is printed and is scanned by the scanner after that, a picture quality is bad.

In such a conventional apparatus, whether the document has already been registered in the image filing system or not cannot be known from the word processor side. Therefore, when unregistered documents are registered in a lump, the user must judge whether they are registered or not while operating both of the image filing system and the word processor (refer to step S23). Not only it is troublesome to judge, consequently, but also an accident such that the document is registered twice or the like easily occurs.

There is also a problem such that since the user needs to operate while switching two application programs of the word processor and the image filing system, it is very troublesome.

Further, after the document was registered into the image filing system, when the user wants to amend the original document by the word processor, there is a problem such that a matching of the data is lost and the data cannot be managed or the user is constrained to register the document again each time it is amended, so that a burden is large or the like.

The present invention, therefore, intends to provide a registration into an image filing system which can amend data without operating both of the image filing system and a data forming apparatus and without losing a matching of the data between the image filing system and the data forming apparatus.

SUMMARY OF THE INVENTION

According to the invention, there is provided an image registering method of registering an image formed by another system into an image filing system, wherein the other system is made operative from the image filing system, an image to be registered by another system is developed in a memory area, and the image developed in the memory area is registered by the image filing system.

BRIEF DESCRIPTION OF THE DRAWINGS

FIG. 5 is a flowchart showing a registration processing routine of an image filing application; and FIG. 6 is a flowchart showing a conventional registering procedure.

DETAILED DESCRIPTION OF THE PREFERRED EMBODIMENTS

[First embodiment]

An embodiment regarding the registration of a document formed by a word processor or the like into an image filing system according to the present invention will now be described.

The embodiment of the invention will be explained hereinbelow with reference to the drawings.

Figure 1:
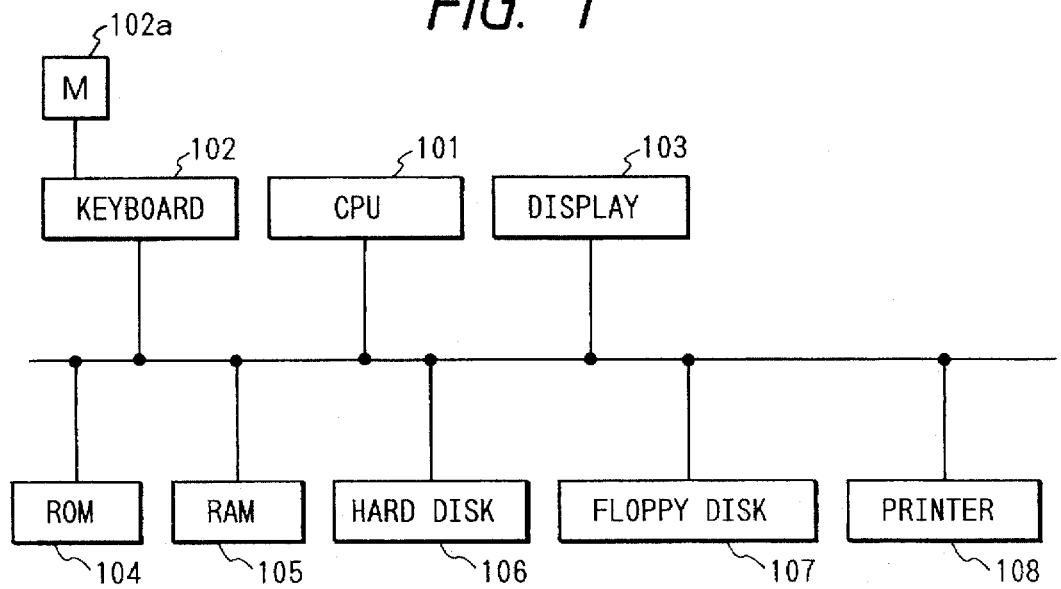
FIG. 1 is a block diagram showing a construction of a system to which the invention is embodied.

FIG. 1 is a block diagram showing a construction of a computer system to which the invention is embodied. In FIG. 1, reference numeral 101 denotes a CPU for controlling the whole system; 102 a keyboard which is used to input a desired operation to the system together with a mouse 102a; 103 a display constructed by a CRT, an LCD, or the like; 104 an ROM; 105 an RAM which constructs a memory device of the system and stores a program that is executed by the system and data that is used by the system; 106 a hard disk; 107 a floppy disk which constructs an external memory device that is used in a filing system of the system; and 108 a printer.

In the system, further, a plurality of application programs cooperatively operate under the management of an operating system (OS) having a function of a multitask system or a task switch. Therefore, an application program of the word processor and an application program of the image filing system cooperatively operate under the management of the OS.

Figure 2:
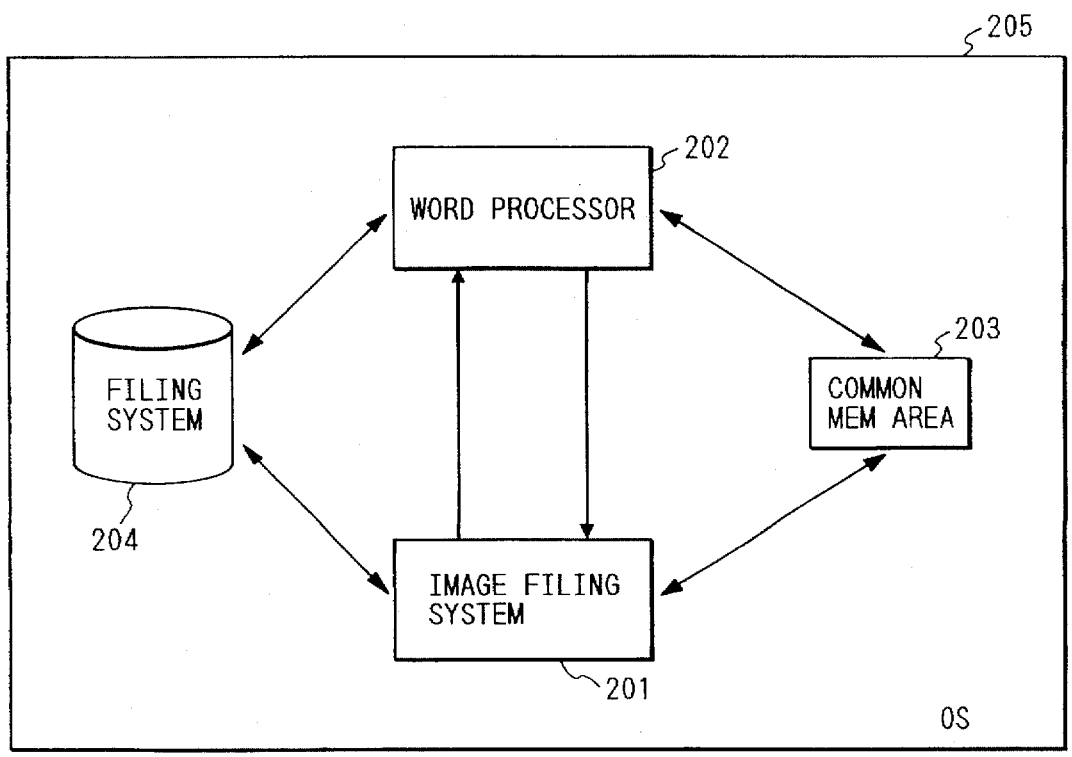
FIG. 2 is a block diagram for explaining the operation of the invention.

FIG. 2 is a functional block diagram for explaining the embodiment of the invention. In FIG. 2, reference numeral 201 denotes an application program of the image filing system; 202 an application program of the word processor. Those application programs operate under the management of the operating system (OS) 205. Reference numeral 203 denotes a common memory area which can be commonly accessed from both of the application programs 201 and 202. Reference numeral 204 denotes a filing system which is constructed in an external memory device and in which files which are used in the image filing system 201 and word processor 202 have been stored. The common memory area 203 and filing system 204 are also managed by the operating system (OS) 205.

In the above system, the application programs 201 and 202 can access to arbitrary data in the common memory area 203 or an arbitrary file in the filing system 204. The application programs 201 and 202 can mutually communicate by a function of an inter-application communication.

In the above system, the embodiment of the invention in which a document file of the word processor 202 stored in the filing system 204 is registered into the image filing system 201 will now be described with reference to a flowchart of FIG. 3.

Figure 3:
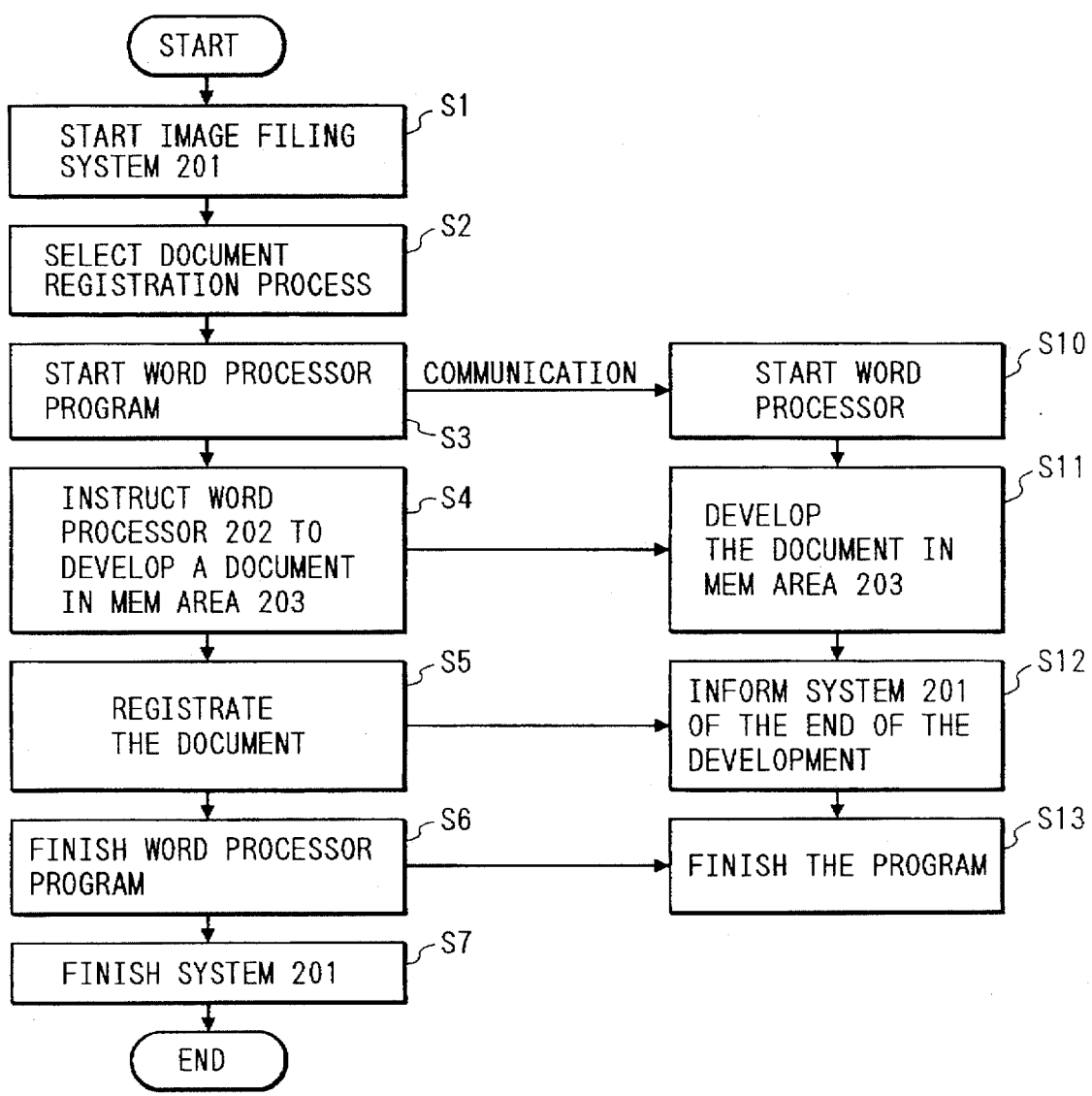
FIG. 3 is a flowchart showing the operation of the invention.

In the flowchart of FIG. 3, the user starts the image filing system 201 in step S1. When a process to register the document of the word processor is selected in the image filing system 201 by the user (step S2), the image filing system starts the application program of the word processor 202 by using the inter-application communicating function (steps S3, S10). Since the start of the application program and the following instructions to the word processor 202 are automatically executed by the image filing system, for the user doesn't need to start and instruct the word processor. It is, therefore, unnecessary to display an interface between the user and the word processor program 202.

The image filing system 201 subsequently instructs the word processor 202 to develop the designated document into the common memory area 203 (step S4). The word processor 202 reads out the designated document from the filing system 204 and develops the document to a format into the common memory area 203 such that the image filing system 201 can process (step S11). As such formats, there are an image description language such as bit map format, postscript, or LIPS and the like. After completion of the development, an end of the development is notified from the word processor 202 to the image filing system 201 (step S12).

The image filing system 201 which received the notification registers the document developed in the common memory area 203 (step S5). The image filing system 201 finishes the program of the word processor (steps S6, S13). After the document was developed in the common memory area, the word processor program can be also automatically finished without giving any instructions from the image filing system 201. In this case, step S6 is unnecessary. In this manner, the document of the word processor 202 can be registered into the image filing system 201 without printing.

Although the embodiment has been described with respect to the document of the word processor, the program and document as targets are not limited to such a document. For example, the invention can be also applied to a program of a drawing tool and a diagram formed by it, a table calculating program and a table formed by it, or the like.

The above embodiment has been described on the assumption that the image filing system and the word processor operate as two processes on the same computer system. However, the image filing system and the word processor can also operate on the different processor systems. In this case, those systems cooperatively operate by communicating with the computers by using a network. As a memory area in which the document is developed, an area of the word processor in the computer system in which the word processor operates is used. Each of the apparatuses is not limited to a general computer system but a word processor exclusive-use apparatus or an image filing exclusive-use apparatus can be also used. In this case, those apparatuses are constructed so that they can operate in cooperation with another system by communicating on a network.

According to the invention as described above, the following problems in the conventional system can be solved.
1. The word processor system needs to have the printer.
2. The image filing system needs to have the scanner.
3. It takes a time for printing and scanning.
4. It is necessary for the user to carry the document from the printer to the scanner.
5. A paper is necessary in order to print the paper and scan the printed paper by the scanner.
6. Since the paper is printed and is scanned by the scanner after that, a picture quality is bad.

[Second embodiment]

Figure 4:
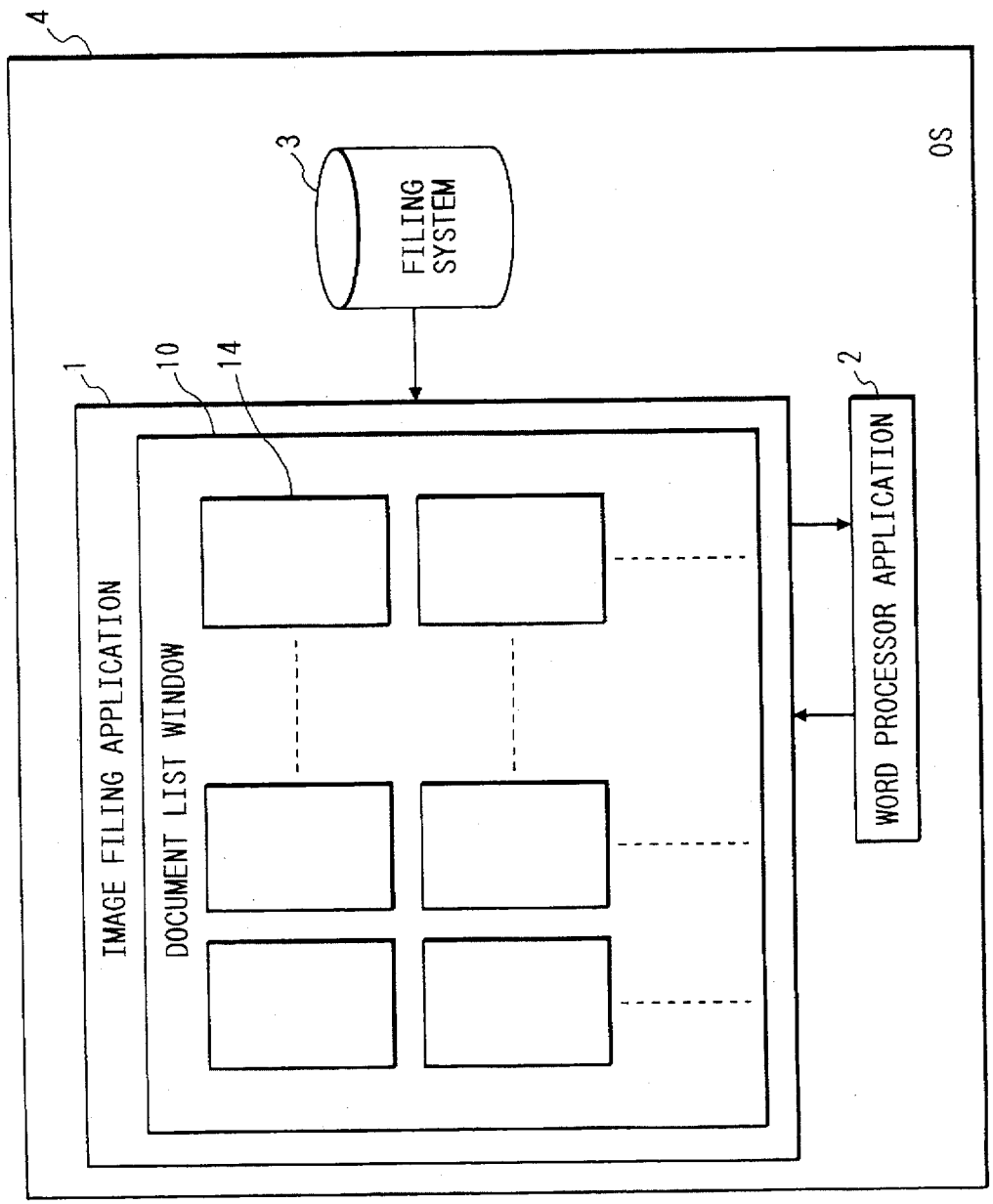
FIG. 4 is an explanatory diagram showing a schematic construction of an image filing system which provides a list of word processor documents stored in a word processor.

FIG. 4 is an explanatory diagram showing a conceptual construction of the image filing system for presenting a list of word processor documents stored in the word processor. In the diagram, reference numeral 1 denotes an image filing application; 2 a word processor application; and 3 a filing system. The applications 1 and 2 and filing system 3 are resources of a general computer (not shown) or application softwares which operate thereon and cooperatively operate under the management of an operating system (OS) 4 which can be used while switching a plurality of applications.

The image filing application 1 and word processor application 2 can access to an arbitrary file of the filing system 3 and can also mutually communicate by using an inter-process communicating function of the operating system 4. The general functions of the word processor application 2 and image filing application 1 are omitted because they are well known.

In the embodiment, the case where the user who uses the image filing application 1 registers the word processor document stored in the filing system 3 into the image filing application will now be described in detail.

FIG. 5 is a flowchart showing a registration processing routine of the image filing application. The image filing application 1 first searches the word processor documents existing in the filing system 3 (step S31). Whether the searched file is the word processor document or not can be also judged by using, for example, an extension of the file.

Subsequently, the image filing application 1 starts the word processor application 2 by the inter-process communicating function of the operating system 4 and an icon 14 of the file of the word processor document searched in step S31 is formed by the word processor application 2 (step S32). It is assumed that the icon 14 has a size and a resolution such that a feature of the document can be distinguished.

When the word processor application 2 has a function to form the icon in a designated size, the image filing application 1 instructs the word processor application 2 so as to form the icon of the size suitable for the display. If the word processor application 2 doesn't have such a function, the icon formed by the word processor application is properly variably magnified by the image filing application 1.

Since the user doesn't need to directly operate the word processor application 2, by constructing so as not to display a GUI portion of the word processor application 2, a confusion on the operation of the user can be avoided.

Further, the image filing application 1 displays a group of icons to a document list window 10 (step S33). The user selects a necessary document in an interactive manner while looking at the list of icons 14 (step S34) and registers the selected document (step S35). The selected document can be registered each time one document is selected. After a plurality of documents were selected, they can be also registered in a lump.

According to the embodiment as mentioned above, the document is not registered while operating both of the image filing system and the word processor. The double registration can be prevented by a simple operation. A matching between the data of the image filing system and the word processor can be realized.

The embodiment has been described in particular with respect to the word processor document. However, the invention is not limited to the word processor document but can be also similarly applied to the case where a diagram formed by the drawing tool, a table formed by the table calculating software, or the like is fetched into the image filing application. In the case where a plurality of word processor applications exist, a system can be also similarly constructed by unconditionally making the word processor documents and the word processor applications by which the documents were formed correspond to each other by a general method such that an individual extension is added every word processor application.

[Third embodiment]

In the second embodiment, when the word processor document is searched from the filing system 3 in step S31 in FIG. 5, all of the files have been presented. However, in place of presenting all of the files, it is also possible to discriminate whether the document has already been registered or not and to selectively present only the documents which are not yet registered.

By selecting only the documents which are not registered and presenting them as mentioned above, the number of icons which are selected by the user in an interactive manner in step S34 is reduced, an efficiency of the registering operation can be improved, and the double registration can be also prevented. As a method of judging whether the document has been registered or not, for example, it is also possible to prepare a data base of document titles in the image filing application and to register the document title into the data base each time a new document is registered or to provide a field to store the titles of the original documents into the filing image.

[Fourth Embodiment]

In the second embodiment, all of the files have been presented. However, the documents which have already been registered and in which the original documents were changed are presented in the fourth embodiment.

The discrimination regarding whether the document has already been registered or not can be executed by a method similar to that shown in the third embodiment. As for the discrimination regarding whether the original document has been changed after completion of the registration or not, as generally executed, it is sufficient that the day and time when the document has been written into the document file at last are recorded as attributes of the file and such writing day and time are compared with the day and time of the creation of the image data.

Among the documents presented as mentioned above, with regard to the documents which were again registered in step S35, the previously registered image data is deleted or is managed as backup data which is concerned with the latest data, thereby avoiding that the matching of the data is lost.

The image filing system can be easily updated by the method shown above.

According to the image registering apparatus of the invention, the list of the formed data stored in another system is presented to the image filing system by the presenting means and the formed data is designated by the designating means in order to register the presented formed data into the image filing system, so that there is no need to register the formed data while operating both of the image filing system and the data forming apparatus and the operating efficiency can be improved.

According to the image registering apparatus, a check is made by the discriminating means to see if the formed data stored in another system has already been registered in the image filing system or not and the presenting means presents the formed data which is not yet registered, so that the number of formed data which is selected by the user in an interactive manner is reduced, an efficiency of the registering operation can be improved, and the double registration can be prevented.

According to the image registering apparatus, the data forming application to manage another system is started by the starting means by the inter-process communication, the formed data is developed to the image data by the developing means into the memory area that can be read out from both of the data forming application and the image filing application to manage the image filing system in accordance with the data forming application started, and the presenting means presents the developed formed data, so that the operating efficiency can be further improved.

According to the image registering apparatus, the presenting means variably magnifies the image data developed in accordance with the data forming application and presents, so that a list of formed data which can be easily understood to the user can be presented.

According to the image registering apparatus, the presenting means designates the image size and allows the data forming application to develop, so that the list of formed data which can be easily understood to the user can be presented.

According to the image registering apparatus, the formed data and the image data in which the formed data has been registered are made correspond by the correspondence applying means, the time of the creation of the formed data and the time of the development of the image data which were made correspond are compared by the comparing means, and the presenting means presents the list of data formed by the word processor when the formed data is newer than the registered image data, so that even after the data was amended by the data forming apparatus, the matching of the data with the image filing system can be accomplished and the image filing system can be easily updated.

According to the image registering apparatus, the formed data and the data forming application used for the formed data are made correspond by the correspondence applying means and the formed data is developed by the data forming application which was made correspond, so that the formed data can be developed every plurality of applications and the operating efficiency for the user can be further improved.

What is claimed is:

1. An image registering method of registering an image formed by another system into an image filing system, comprising the steps of:

making the other system operative from the image filing system;

developing image data previously registered by the other system into a developed image that can be processed by the image filing system; and registering the developed image into the image filing system.

2. A method according to claim 1, wherein the other system is a drawing system.

3. A method according to claim 2, wherein the image filing system and the other system are application programs which operate in a same computer system, and the image filing system and the other system communicate by an inter-application communication.

4. A method according to claim 2, wherein the image filing system and the other system operate in different computer systems and the computer systems communicate by a network.

5. A method according to claim 1, wherein the other system is a word processor.

6. A method according to claim 5, wherein the image filing system and the other system are application programs which operate in a same computer system, and the image filing system and the other system communicate by an inter-application communication.

7. A method according to claim 5, wherein the image filing system and the other system operate in different computer systems and the computer systems communicate by a network.

8. A method according to claim 1, wherein the image filing system and the other system are application programs which operate in a same computer system, and the image filing system and the other system communicate by an inter-application communication.

9. A method according to claim 1, wherein the image filing system and the other system operate in different computer systems and the computer systems communicate by a network.

10. A method according to claim 1, further comprising the step of making the other system inoperative from the other system.

11. An image registering system for registering an image formed by another system into an image filing system, comprising:

making the other system operative from the image filing system;

developing image data previously registered by the other system into a developed image that can be processed by the image filing system;

registering the developed image into the image filing system.

12. A system according to claim 11, wherein the other system is a drawing system.

13. A system according to claim 12, wherein the image filing system and the other system are application programs which operate in a same computer system, and the image filing system and the other system communicate by an inter-application communication.

14. A system according to claim 12, wherein the image filing system and the other system operate in different computer systems and the computer systems communicate by a network.

15. A system according to claim 11, wherein the other system is a word processor.

16. A system according to claim 15, wherein the image filing system and the other system are application programs which operate in a same computer system, and the image filing system and the other system communicate by an inter-application communication.

17. A system according to claim 15, wherein the image filing system and the other system operate in different computer systems and the computer systems communicate by a network.

18. A system according to claim 11, wherein the image filing system and the other system are application programs which operate in a same computer system, and the image filing system and the other system communicate by an inter-application communication.

19. A system according to claim 11, wherein the image filing system and the other system operate in different computer systems and the computer systems communicate by a network.

20. A system according to claim 11, further comprising means for making the other system inoperative from the image filing system.

21. An image registering system for registering an image formed by another system into an image filing system, comprising:

means for making the other system operative from the image filing system;

presenting means for presenting a list of data stored in the other system to the image filing system;

designating means for designating one of the data from the list of data presented by said presenting means;

developing means for developing the designated data into a developed image that can be processed by the image filing system; and registering means for registering the developed image into the image filing system.

22. A system according to claim 21, further having discriminating means for discriminating whether a developed image corresponding to each of the data on the list and stored in the other system has already been registered in the image filing system or not, and wherein said presenting means presents only data for which an image is not yet registered.

23. A system according to claim 21, further having:

start means for starting a data forming application to manage the other system by an inter-process communication, wherein the developing means develops the data in a memory area which can be read out from both of the started data forming application and an image filing application to manage the image filing system in accordance with the started data forming application.

24. A system according to claim 23, wherein said developing means variably magnifies the developed image in accordance with the started data forming application.

25. A system according to claim 23, wherein said presenting means designates an image size and the started application program develops the image in the designated image size.

26. A system according to claim 23, further comprising:

correspondence applying means for making a correspondence between data and images already registered; and comparing means for comparing a time of creation of each data and a time of development of the registered image which was made correspond thereto, and wherein said presenting means presents, on the list, data which is newer than the corresponding registered image.

27. A system according to claim 23, wherein a plurality of such data forming applications are provided and wherein said system further comprises correspondence applying means for making the designated data and one of the data forming applications correspond to each other, and wherein the one data forming application is started.

28. An image registering method of registering an image formed by another system into an image filing system, comprising the steps of:

making the other system operative from the image filing system;

presenting a list of data stored in the other system to the image filing system;

designating one of the data from the list of data presented by said presenting step;

developing the designated data into a developed image that can be processed by the image filing system; and registering the developed image into the image filing system.

29. A method according to claim 28, further having a discriminating step of discriminating whether a developed image corresponding to each of the data on the list and stored in the other system has already been registered in the image filing system or not, and wherein said presenting step presents only data for which an image is not yet registered.

30. A method according to claim 28, further having:

a starting step of starting a data forming application to manage the other system by an inter-process communication, wherein the developing step develops the data in a memory area which can be read out from both of the started data forming application and an image filing application to manage the image filing system in accordance with the started data forming application.

31. A method according to claim 30, wherein said developing step variably magnifies the developed image in accordance with the started data forming application.

32. A method according to claim 30, wherein said presenting step designates an image size and the started application program develops the image in the designated image size.

33. A method according to claim 30, further comprising:

a correspondence applying step of making a correspondence between data and images already registered; and a comparing step of comparing a time of creation of each data and a time of development of the registered image which was made correspond thereto, and wherein said presenting step presents, on the list, data which is newer than the corresponding registered image.

34. A method according to claim 30, wherein a plurality of such data forming applications are provided and wherein said method further comprises a correspondence applying step of making the designated data and one of the data forming applications correspond to each other, and wherein the one data forming application is started.

35. A memory medium for storing a program such that, when said memory medium is installed in a programmable apparatus, the apparatus performs an image registering method of registering an image formed by another system into an image filing system, said method comprising the steps of:

making the other system operative from the image filing system;

developing image data previously registered by the other system into a developed image that can be processed by the image filing system; and registering the developed image into the image filing system.

36. A memory medium according to claim 35, wherein the other system is a drawing system.

37. A memory medium according to claim 36, wherein the image filing system and the other system are application programs which operate in a same computer system, and the image filing system and the other system communicate by an inter-application communication.

38. A memory medium according to claim 36, wherein the image filing system and the other system operate in different computer systems and the computer systems communicate by a network.

39. A memory medium according to claim 35, wherein the other system is a word processor.

40. A memory medium according to claim 39, wherein the image filing system and the other system are application programs which operate in a same computer system, and the image filing system and the other system communicate by an inter-application communication.

41. A memory medium according to claim 39, wherein the image filing system and the other system operate in different computer systems and the computer systems communicate by a network.

42. A memory medium according to claim 35, wherein the image filing system and the other system are application programs which operate in a same computer system, and the image filing system and the other system communicate by an inter-application communication.

43. A memory medium according to claim 35, wherein the image filing system and the other system operate in different computer systems and the computer systems communicate by a network.

44. A memory medium according to claim 35, further comprising the step of making the other system inoperative from the other system.

45. A memory medium for storing a program such that, when said memory medium is installed in a programmable apparatus, the apparatus performs an image registering method of registering an image formed by another system into an image filing system, said method comprising the steps of:

making the other system operative from the image filing system;

presenting a list of data stored in the other system to the image filing system;

designating one of the data from the list of data presented by said presenting step;

developing the designated data into a developed image that can be processed by the image filing system; and registering the developed image into the image filing system.

46. A memory medium according to claim 45, further having a discriminating step of discriminating whether a developed image corresponding to each of the data on the list and stored in the other system has already been registered in the image filing system or not, and wherein said presenting step presents only data for which an image is not yet registered.

47. A memory medium according to claim 45, further having:

a starting step of starting a data forming application to manage the other system by an inter-process communication, wherein the developing step develops the data in a memory area which can be read out from both of the started data forming application and an image filing application to manage the image filing system in accordance with the started data forming application.

48. A memory medium according to claim 47, wherein said developing step variably magnifies the developed image in accordance with the started data forming application.

49. A memory medium according to claim 47, wherein said presenting step designates an image size and the started application program develops the image in the designated image size.

50. A memory medium according to claim 47, further comprising:

a correspondence applying step of making a correspondence between data and images already registered; and a comparing step of comparing a time of creation of each data and a time of development of the registered image which was made correspond thereto, and wherein said presenting step presents, on the list, data which is newer than the corresponding registered image.

51. A memory medium according to claim 47, wherein a plurality of such data forming applications are provided and wherein said method further comprises a correspondence applying step of making the designated data and one of the data forming applications correspond to each other, and wherein the one data forming application is started.

* * * * *

UNITED STATES PATENT AND TRADEMARK OFFICE
CERTIFICATE OF CORRECTION

PATENT NO. : 5,745,907

DATED : April 28, 1998

INVENTOR(S) : KUNIHIRO YAMAMOTO

It is certified that error appears in the above-identified patent and that said Letters Patent is hereby corrected as shown below:

<u>COLUMN 7</u>

Line 58, "system;" should read --system; and--.

Signed and Sealed this

Twenty-ninth Day of September, 1998

Attest:

BRUCE LEHMAN

Attesting Officer

Commissioner of Patents and Trademarks